United States Patent
Brandt

(10) Patent No.: US 7,847,206 B2
(45) Date of Patent: Dec. 7, 2010

(54) MAILPIECE REJECT PROCESSING WITH WINDOW INSERTS

(75) Inventor: William R Brandt, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 194 days.

(21) Appl. No.: 12/209,426

(22) Filed: Sep. 12, 2008

(65) Prior Publication Data

US 2009/0008304 A1 Jan. 8, 2009

Related U.S. Application Data

(63) Continuation of application No. 11/932,970, filed on Oct. 31, 2007.

(60) Provisional application No. 60/856,425, filed on Nov. 1, 2006.

(51) Int. Cl.
*G06K 9/00* (2006.01)

(52) U.S. Cl. .................. 209/584; 209/900; 209/540; 209/541

(58) Field of Classification Search ................ 209/583, 209/584, 540, 541, 900; 382/101, 102; 700/213, 700/214, 223

See application file for complete search history.

(56) References Cited

U.S. PATENT DOCUMENTS

| | | | | |
|---|---|---|---|---|
| 4,158,835 A | * | 6/1979 | Miura et al. | ................ 382/101 |
| 4,828,104 A | * | 5/1989 | Ribellino, Jr. | ................ 229/71 |
| 5,287,271 A | | 2/1994 | Rosenbaum | |
| 5,291,002 A | * | 3/1994 | Agnew et al. | ............... 235/375 |
| 5,363,971 A | * | 11/1994 | Weeks et al. | ................ 209/584 |
| 5,468,945 A | * | 11/1995 | Huggett et al. | ......... 235/462.02 |
| 5,518,122 A | | 5/1996 | Tilles et al. | |
| 5,612,889 A | | 3/1997 | Pintsov et al. | |
| 5,912,979 A | | 6/1999 | Gavrilos | |
| 6,359,360 B1 | | 3/2002 | Lungu | |
| 2008/0164185 A1 | * | 7/2008 | Stemmle | ................ 209/584 |

OTHER PUBLICATIONS

NEC; Postal Automation; 2002; 4 pages; http://www.nec.co.jp/control/en/product/postal/solution_mech.html.
NEC; Online/ Offline combined OCR/VCS; 2002; 3 pages; http://www.nec.co.jp/control/en/product/postal/product_nav.html.
NEC; Letter Sorting Machine; 2002; 2 pages; http://www.nec.co.jp/control/en/product/postal/product_nbs.html.
NEC; Carrier Sequence Bar Code Sorter (Semi-automatic Type); 2002; 2 pages; http://www.nec.co.jp/control/en/product/postal_ncs.html.
NEC; Integrated Letter Sorting Machine; 2002; 4 pages; http://www.nec.co.jp/control/en/product/postal/product_ilps.html.
NEC; Flat Sorting Machine/ NFS Series; 2002; 3 pages; http://www.nec.co.jp/control/en/product/postal/product_nfs.html.

(Continued)

*Primary Examiner*—Stefanos Karmis
*Assistant Examiner*—Terrell H Matthews
(74) *Attorney, Agent, or Firm*—Stolowitz Ford Cowger LLP

(57) ABSTRACT

Improvements are disclosed for further processing of a mail piece initially rejected from an automatic sorting machine. In the case of a window envelope, the envelope is rotated or inverted, shaken, and rotated to reposition the insert. Address recognition is repeated, and additional techniques are applied if an address is not quickly resolved. Additional processing may be carried out on a reject processing machine.

15 Claims, 9 Drawing Sheets

OTHER PUBLICATIONS

USPS; POSTNET Barcodes; Designing Letter and Reply Mail, Ch. 4; Jun. 2003; 11 pages; http://pe.usps.gov/text/Pub25/Pub25ch4.htm.
USPS; Automation Addressing; Designing Letter and Reply Mail, Ch. 3; Jun. 2003; 10 pages; http://pe.usps.gov/text/Pub25/Pub25ch3.htm.
Siemens; Integrated Reader Video System; 2006; 2 pages; http://www.industry.siemens.com/postal%2Dautomation/en/products_solutions/products_IRV.htm.
Siemens; Format separating, facing and canceling machines; 2006; 2 pages; http://www.industry.siemens.com/postal%2Dautomation/en/products_solutions/products_format_facing_canceling.htm.

* cited by examiner

MAILPIECE REJECT PROCESSING WITH WINDOW INSERTS

RELATED APPLICATIONS

This application is a continuation of pending U.S. application Ser. No. 11/932,970 filed Oct. 31, 2007 entitled "Mailpiece Reject Processing and Labeling," which claims priority from U.S. Provisional Application No. 60/856,425 filed Nov. 1, 2006, both incorporated herein by this reference.

COPYRIGHT NOTICE

© 2006-2008 RAF Technology. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and apparatus for sorting and handling items, such as mail pieces, and more specifically to improvements in reading addresses that are obscured or misaligned relative to a window in an envelope.

BACKGROUND OF THE INVENTION

Glossary of Acronyms

Delivery Bar Code Sorter (DBCS) sorts mail in the order of a mail carrier's delivery route. This order is called the Delivery Point Sequence (DPS). However, some mailpieces are not processed on a DBCS because the POSTNET barcode cannot be resolved.

POSTNET (POSTal Numeric Encoding Technique) barcode is used to encode zip code information on letter mail. Output Sub-System is (OSS). Newly labeled mailpieces may be sent to and run through a system running in an Input Sub-System (ISS) mode (e.g., a MLOCR or Advanced Facer Canceller System (AFCS) may be running in ISS mode or a DBCS may have been modified with an ISS kit). Remote computer read (RCR) refers to using algorithms on computers that are separate from the mainstream mailpiece sorter machine. Remote Encoding Center (REC) refers to a physical facility where mail is processed.

Reject Encoding Machine (REM) is any of various machines and associated software described herein for use in processing mailpieces where the mainstream sorting process did not succeed. Advanced OCR recognition system refers to a system for optical character recognition that employs advanced recognition software algorithms for resolving an address of a mailpiece.

Referring now to the drawings, FIG. 1 is a front (address side) of mailpiece 100 having several areas reserved for addressing. With reference to FIG. 1, mailpiece 100 has postage area 102, optical character recognition (OCR) read area 106, POSTNET clear zone 108, and return address area 104. By way of example, if address 314 (FIG. 3) is located within OCR read area 106, a multiline optical character reader (MLOCR) may be able to resolve address 314 and print a Postal Numeric Encoding Technique (POSTNET) barcode, such as POSTNET barcode 300 (FIG. 3), in POSTNET clear zone 108.

With reference to FIG. 2, ID Tag clear zone 202 is on the rear side (back side) of mailpiece 200. A unique ID Tag (not shown) may be applied to the back of mailpiece 200 (in ID Tag clear zone 202) to allow data to be matched with mailpiece 200 in subsequent automated operations. For example, if address 314 cannot be read by an OCR, an image may be captured and sent to a Remote Encoding Center (REC). A keyer (manual input person) at the REC can input data, such as the zip code 304 and plus-four code 306, into a database. The ID Tag allows the data to be matched with the specific mailpiece and POSTNET barcode 300 to be applied downstream (e.g. by an Output Sub-System).

Referring now to FIG. 3, POSTNET barcode 300 corresponds to address 314. Frame bars 302 and 312 begin and end the barcode sequence. POSTNET barcode 300 is an eleven-digit delivery point code representing zip code in field 304, plus-four code in field 306, delivery point code at field 308, and finally a check digit 310. Delivery point code 308 may be a specific set of digits between 00 and 99 such as the last two digits of a street address. The delivery point code 308, zip code 304, and plus-four code 306 result in a unique, numeric identifier for nearly every address served by the United States Postal Service (USPS). Check digit 310 essentially is a form of redundancy check used for error detection. Other POSTNET barcodes may also be applied to POSTNET clear zone 108, such as a nine-digit barcode representing zip code 304 and plus-four code 306, a five-digit barcode representing zip code 304, or a 4-state barcode where the bars represent four states (e.g., four lengths) instead of just two states (e.g., two lengths).

Although bar codes are currently in use by the USPS and are discussed herein by way of example, the inventive concepts disclosed in this application could be applied as well to systems and methods that employ other machine-readable or optically readable codes or markings in the POSTNET clear field and/or in the ID Tag field. We will use the term machine-readable indicia or "MRI" in the claims in this broader sense; MRI includes but is not limited to bar codes. It applies as well to other markings that can be applied to an article by automated machinery (printed, sprayed, etc.) and conversely can be recognized or read by machine.

Using an automated process to sort mailpieces is generally more cost effective than using manual labor. However, if address 314 is not resolvable (e.g., by an OCR or REC), the mailpiece must be manually sorted. This is a relatively expensive process. The need remains for improvements in reject processing and labeling of mail piece items.

SUMMARY OF THE INVENTION

According to one embodiment, instead of sending the mailpieces through a manual sort process, the mailpieces may be sent to a labeling machine having an on-board OCR engine, such as a Reject Encoding Machine (REM). The REM may over-label POSTNET clear zone 108 (e.g., apply a label over the clear zone). In addition, if a bad ID Tag is detected (e.g., the ID Tag cannot be resolved—i.e., matched with a corresponding database record), ID Tag clear zone 202 may also be over-labeled.

The REM may also incorporate an image capture device, for example a digital camera and associated software, that may capture a resolvable image whereas the main sorter process failed to do so for that mailpiece (e.g., the REM image capture device may have a higher resolution or use different optics, hardware, or software that allows a different image of the mailpiece to be captured). Furthermore, the OCR may be running different algorithms (e.g., orthogonal OCR engines).

Accordingly, the image capture device or OCR of the REM may be able to resolve address 314 and apply barcode 300. The mailpiece can then be sent to a Delivery Bar Code Sorter (DBCS) for automated sorting. However, if the REM cannot resolve address 314, POSTNET clear zone 108 or ID Tag clear zone 202 may still be over-labeled for downstream processing. Therefore, the REM may save costs in terms of time and money by reintroducing mailpieces into the automated stream instead sorting the mailpieces by hand.

DETAILED DESCRIPTION OF A PREFERRED EMBODIMENT

Address 314 may not be resolvable because a bad image was captured of the mailpiece. For example, the image may not be readable, the image may not contain an address (e.g., the image capture device was not properly aligned or an insert was not aligned with a window of an envelope), there may not be sufficient contrast in the image, or the captured text may be too light. In addition, the OCR may not incorporate the correct algorithm needed to resolve the address.

According to one embodiment, instead of sending the mailpieces through a manual sort process, the mailpieces may be sent to a labeling machine having an on-board OCR engine, such as a Reject Encoding Machine (REM). The REM may over-label POSTNET clear zone 108 (e.g., apply a label over the clear zone). In addition, if a bad ID Tag is identified (e.g., the ID Tag cannot be resolved), ID Tag clear zone 202 may also be over-labeled. The REM may also incorporate an image capture device that may capture a resolvable image (e.g., the image capture device could have a higher resolution or use different optics, hardware, or software that allows a different image of the mailpiece to be captured). Furthermore, the OCR may be running different algorithms (e.g., orthogonal OCR engines). Accordingly, the image capture device or OCR of the REM may be able to resolve address 314 and apply barcode 300. The mailpiece can then be sent to a Delivery Bar Code Sorter (DBCS) for automated sorting. However, if the REM cannot resolve address 314, POSTNET clear zone 108 or ID Tag clear zone 202 may still be over-labeled for downstream processing. Therefore, the REM may save costs in terms of time and money by reintroducing mailpieces into the automated stream instead sorting the mailpieces by hand.

Labeling Machine Having an On-Board OCR Engine to Process Rejects

Figure 1:
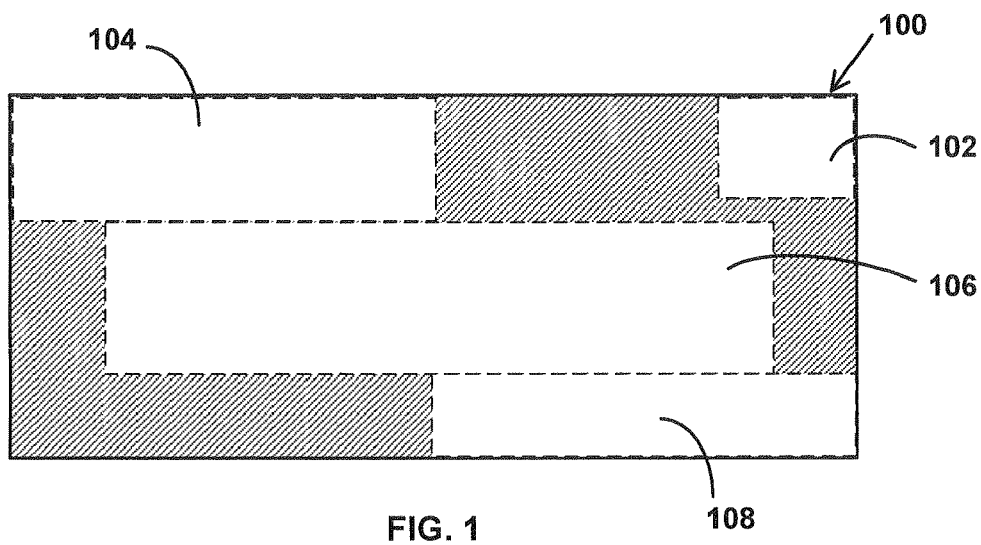
FIG. 1 is a front view of an envelope showing a POSTNET clear zone.
Figure 2:
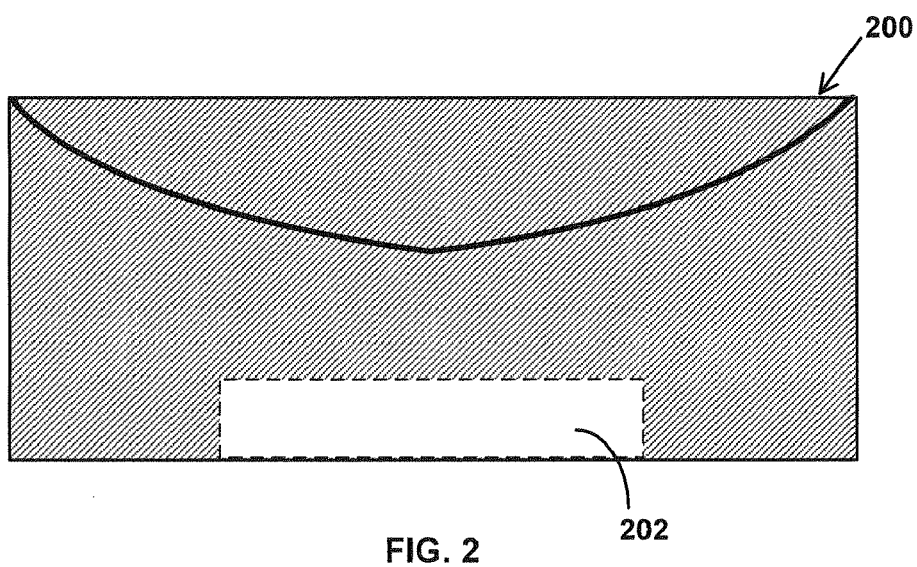
FIG. 2 is a rear view of an envelope showing a ID Tag clear zone.
Figure 3:
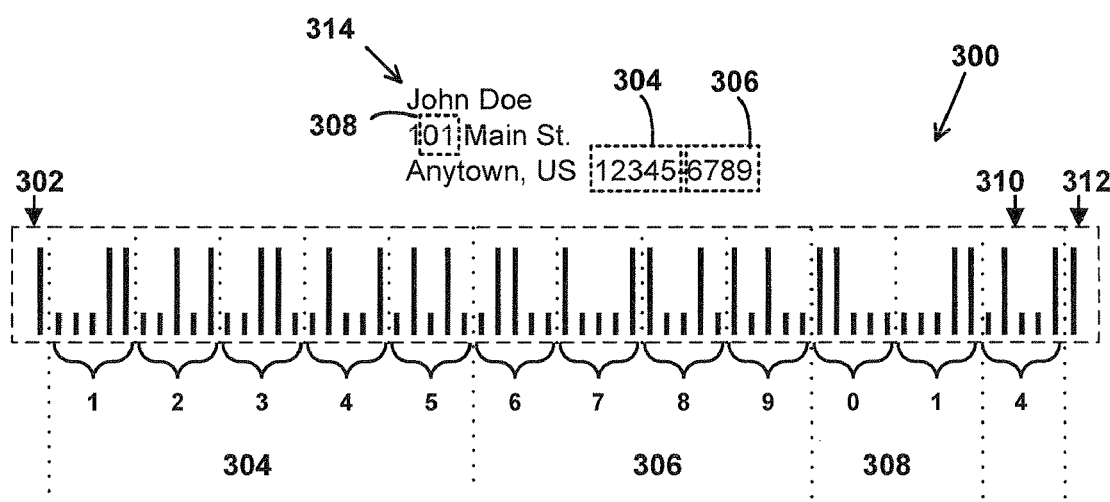
FIG. 3 is a POSTNET barcode illustrating an eleven-digit delivery point barcode.
Figure 4:
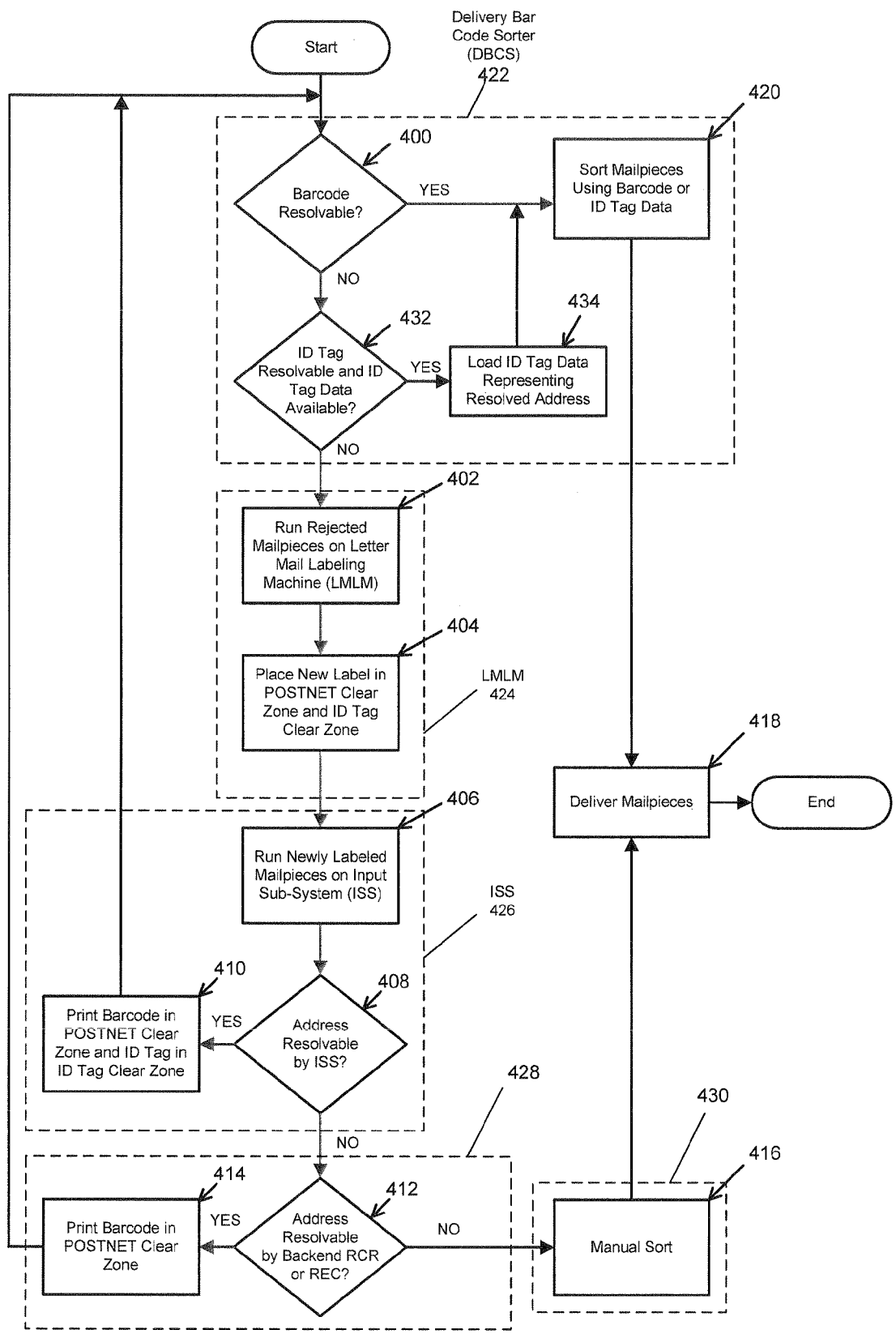
FIG. 4 is a flow chart illustrating a process for over-labeling a clear zone.

A Delivery Bar Code Sorter (DBCS) sorts mail in the order of a mail carrier's delivery route. However, some mailpieces are not processed on a DBCS because POSTNET barcode 300 cannot be resolved. For example, POSTNET barcode 300 may be illegible, due to smudging. In addition, noise or interference, such as stray marks, may be present in POSTNET clear zone 108. With reference to FIG. 4, one process is described that involves over-labeling an unresolved barcode to create a new clear zone. At step 400, mailpieces are fed into DBCS 422, which attempts to resolve POSTNET barcode 300 in POSTNET clear zone 108. If barcode 300 is resolved (e.g., zip code 304, plus-four code 306, delivery point code 308, and check digit 310 are read by a barcode scanner), DBCS 422 sorts the mailpieces at step 420 using barcode 300.

However, if barcode 300 cannot be resolved at step 400, DBCS 422 may attempt to resolve an ID Tag in ID Tag clear zone 202 at step 432. If the ID Tag is resolvable, at step 434 DBCS 422 will attempt to perform a data lookup to see whether any data has been stored for the associated ID Tag, such as a resolved address. At step 420, if data is found, the mailpieces may be sorted using the ID Tag data. At step 418, the mail carrier delivers the sorted mailpieces.

DBCS 422 may also attempt to resolve barcode 300 and the ID Tag for each mailpiece. The data associated with barcode 300 (e.g., zip code 304 and plus-four code 306) can be compared with any data that has been stored for the associated ID Tag. If the data are not consistent, the data associated with barcode 300 may be used instead of the ID Tag data (e.g., data loaded for the ID Tag). On the other hand, if barcode 300 is not resolvable, the ID Tag data may be used.

If, however, barcode 300 cannot be resolved at step 400 and the ID Tag is not resolvable or the ID Tag data is not available at step 432, the mailpieces will be placed in a reject bin of DBCS 422. At step 402, the rejected mailpieces can be sent to and run through Letter Mail Labeling Machine (LMLM) 424. At step 404, LMLM 424 may over-label (e.g., place a new label) POSTNET clear zone 108. In addition, the mailpiece may be run through LMLM 424 with a rear side of mailpiece 200 facing a labeler (not shown) to over-label ID Tag clear zone 202. Over-labeling step 404 provides a clear zone for barcode 300 to be applied in POSTNET clear zone 108 and for the ID tag to be applied in ID Tag clear zone 202.

At step 406, the newly labeled mailpieces may be sent to and run through a system running in an Input Sub-System (ISS) mode 426 (e.g., a MLOCR or Advanced Facer Canceller System may be running in ISS mode or a DBCS may have been modified with an ISS kit). At step 408, ISS 426 attempts to resolve (e.g., determine a full destination barcode 300) address 314. If address 314 is resolved, barcode 300 is applied (e.g. printed or sprayed) in POSTNET clear zone 108 at step 410. In addition, an ID Tag may be applied to ID Tag clear zone 202 if one is needed (e.g., the mailpiece did not have an ID Tag). The mailpieces can be run through DBCS 422 again for sorting. However, if at step 408, address 314 is not resolvable, another attempt may be made at resolving the address at step 412 (which may be on a separate machine 428). This may occur using a remote computer read (RCR), which typically takes longer (e.g., 30 seconds) and uses advanced OCR algorithms. In addition, an image of OCR read area 106 may be sent to a REC. If address 314 is resolvable at step 412, barcode 300 may be applied at step 414 in POSTNET clear zone 108. The mailpieces can be run through DBCS 422 again for sorting. However, if address 314 is not resolvable at step 412, the mailpieces can be sent to a manual sort center 430 for sorting by hand (step 416). At step 418, the mail carrier delivers the hand sorted mailpieces.

Figure 5:
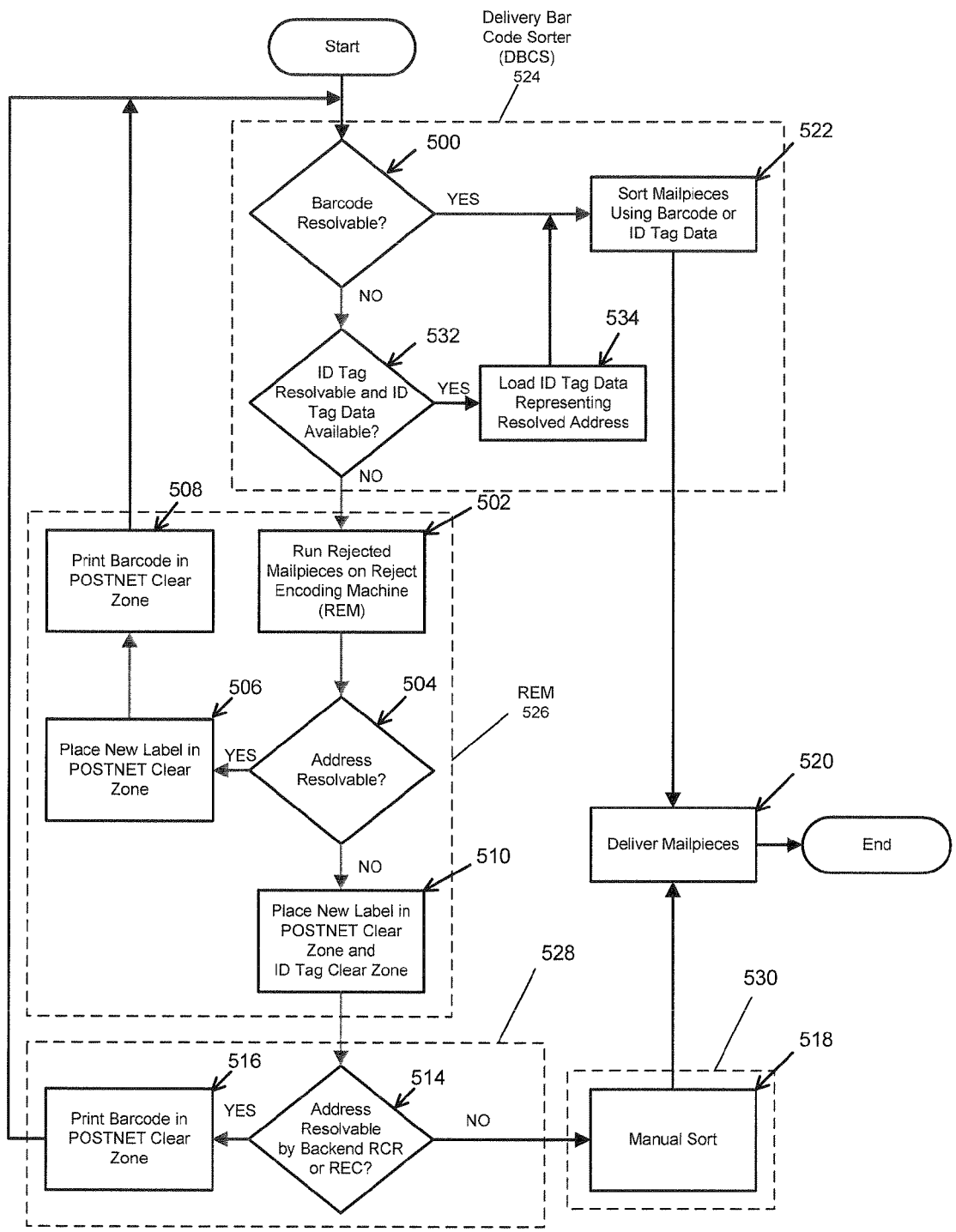
FIG. 5 is a flow chart illustrating a process for over-labeling a clear zone according to one embodiment.

With reference to FIG. 5, a process according to another embodiment involves over-labeling and applying barcode 300 in one step. At step 500, mailpieces are fed into DBCS 524, which attempts to resolve POSTNET barcode 300 in POSTNET clear zone 108. If barcode 300 is resolved, DBCS 524 sorts the mailpieces at step 522 using barcode 300. However, if barcode 300 cannot be resolved at step 500, DBCS 524 may attempt to resolve an ID Tag in ID Tag clear zone 202 at step 532. If the ID Tag is resolvable, at step 532 DBCS 524 will attempt to perform a data lookup to see whether any data has been stored for the associated ID Tag, such as a resolved address. At step 522, if data is found, the mailpieces may be sorted using the ID Tag data. At step 520, the mail carrier delivers the sorted mailpieces.

DBCS 524 may also attempt to resolve barcode 300 and the ID Tag for each mailpiece. The data associated with barcode 300 (e.g., zip code 304 and plus-four code 306) can be compared with any data that has been stored for the associated ID Tag. If the data are not consistent, the data associated with barcode 300 may be used instead of the ID Tag data (e.g., data loaded for the ID Tag). On the other hand, if barcode 300 is not resolvable, the ID Tag data may be used.

If, however, barcode 300 cannot be resolved at step 500 and the ID Tag is not resolvable or the ID Tag data is not available at step 532, the mailpieces will be placed in a reject bin of DBCS 524. At step 502, the rejected mailpieces can be sent to and run through a labeling machine having an on-board OCR engine, such as Reject Encoding Machine (REM) 526. In addition, other mailpieces may be routed to REM 526. For example, if a system running in ISS mode is unable to resolve address 314 (e.g., the image is bad, the image is of insufficient quality, or the OCR does not incorporate the correct algorithm needed to resolve the address), REM 526 may be able to resolve the address using a new image acquisition and advanced OCR algorithms. At step 504, REM 526 attempts to resolve address 314. If address 314 is resolved, a new label (step 506) and barcode 300 (step 508) can be applied in POSTNET clear zone 108 in one step. However, other methods may be used to over-label POSTNET clear zone 108. For example, barcode 300 could be applied to the label before it is applied to POSTNET clear zone 108 of mailpiece 100. In addition, the POSTNET clear zone 108 of the mailpieces may otherwise be repaired. For example, POSTNET clear zone 108 could be resurfaced and barcode 300 applied to the new surface. Furthermore, if the POSTNET clear zone 108 does not need repair (such as when mailpieces are sent to REM 526 because address 314 is not resolvable), REM 526 may resolve the address and apply barcode 300. The mailpieces can be run through DBCS 524 again for sorting. Accordingly, sending the mailpieces to REM 526 provides for a quick turnaround and may allow the mailpieces to be re-run on DBCS 524 while DBCS 524 machine is still processing the batch of mailpieces from which the rejected mailpieces came (e.g., a first pass of Delivery Point Sequence (DPS) on a particular zone).

However, if at step 504, address 314 is not resolvable, a new label can be applied to POSTNET clear zone 108 at step 510. Furthermore, the ID Tag may be resolved by REM 526 and a database may be populated with information regarding the mailpiece. For example, if address 314 or part of address 314 (e.g., zip code 304 or plus-four code 306) were resolved by REM 526, the resolved address or partial data associated with the ID Tag may be stored. In addition, the mailpiece may be run through REM 526 with rear side of mailpiece 200 facing a labeler (not shown) to over-label ID Tag clear zone 202. If REM 526 was fitted with an ID Tag sprayer, an ID Tag may be applied to ID Tag clear zone 202. At step 514, a RCR or REC may attempt to resolve address 314 (this may be done on a separate machine 528). If resolved, barcode 300 may be applied at step 516 to POSTNET clear zone 108. The mailpieces can be run through DBCS 524 again for sorting. However, if address 314 is not resolvable at step 514, the mailpieces can be sent to a manual sort center 530 for sorting by hand (step 518). At step 520, the mail carrier delivers the hand sorted mailpieces. Therefore, if address 314 is successfully resolved (e.g., read) at step 504 and barcoded (steps 506 and 508), greater efficiencies may be achieved. For example, mailpieces initially rejected by DBCS 524 may be sorted more quickly and with less manual labor.

Reject Processing of First Pass DPS Rejects

As previously discussed, a DBCS sorts mail in the order of a mail carrier's delivery route. This order is called the Delivery Point Sequence (DPS) and barcode 300 having the DPS allows for automated sorting from posting to delivery. Once mailpieces are prepared with barcode 300 or received by a serving processing center with barcode 300, the mailpieces must be prepared for DPS. This can be done by sorting the mailpieces to a zone or a zip code range. The zoned mail can be run on a DBCS to be placed in DPS, which generally requires two passes on the DBCS. The first pass sorts all mail by delivery stop mixing the mail for all carriers in that zone. The second pass takes all the mixed carrier mail for each delivery stop and separates it by carrier. On this second pass, the sort plan dedicates one pocket (e.g., bin of the DBCS) per carrier and the mail is sorted in the precise order that carrier traverses their route.

By way of analogy, a deck of shuffled cards may be sequenced using 13 pockets and two passes through the cards. During the first pass, the cards can be sorted by rank (e.g., aces, twos, threes, etc.) into 13 pockets with no regard to suit. At the end of the first pass, all the cards in the first pocket would be aces, all the cards in the second pocket would be twos, and all the cards in the last pocket would be kings. During the second pass, the four cards in the first pocket would be fed out of the pocket. Immediately thereafter, the four cards in the second pocket would be fed out. Each pocket would be emptied in a similar manner. Accordingly, during the second pass the cards can be read and resorted into four pockets by suit with no regard to rank. The four aces would end up on the bottom of each of the fourth pockets because these are the first four cards fed out. The twos would be stacked upon each respective ace and so forth. Upon completion a sequenced deck of cards is obtained by sweeping the cards from left to right.

By way of another example, if there are ten carriers in zone 20007, the first pass would assign the first pocket on a DBCS to the first stop or delivery point for all ten carriers, the second pocket for all of their second stops and so forth. Even though the DBCS mixes carriers in each pocket, it ensures that each pocket contains the same stop number for each route. Then the mail in each bin is removed in order from the DBCS and run separately, in order as a second pass. The second pass sorts the contents of each first-sort output bin by carrier. Thus, all the mail for the first stop for the first carrier goes to bin 1, for the first stop for carrier 2 to bin 2, and so on. Then each subsequent output bin of the first sort is run. The DBCS thus sorts each individual carrier's mail into a separate pocket— ten pockets in all for all ten carriers. Accordingly, all the mail is in delivery sequence order for each carrier.

Figure 6:
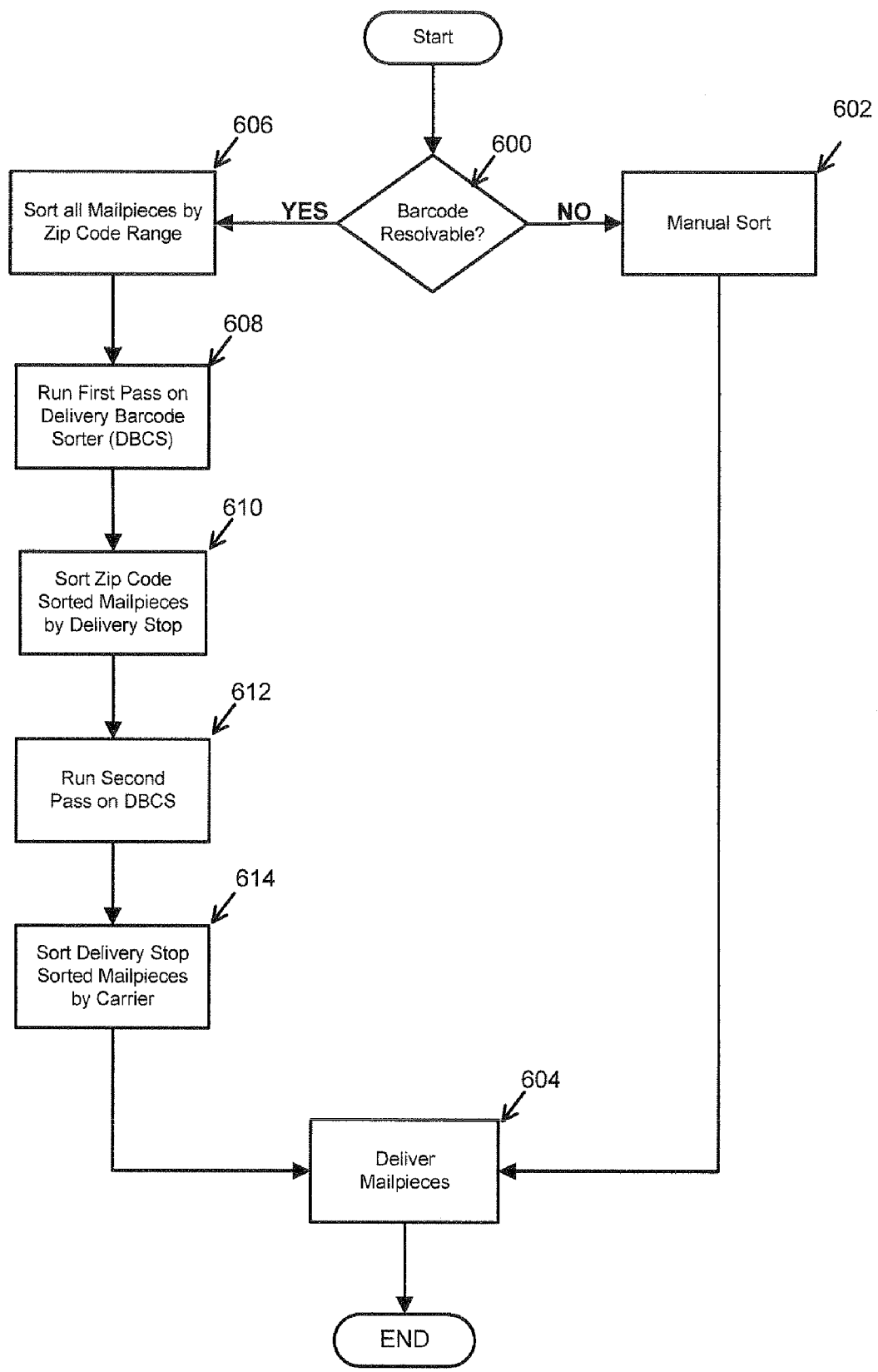
FIG. 6 is a flowchart illustrating a process for handling first pass delivery point sequence rejects.

However, as previously discussed, some barcodes 300 may not be resolved by the DBCS which requires the mailpieces to be manually sorted. Referring now to FIG. 6, if barcode 300 is not resolvable (step 600), the mailpieces are manually sorted. At step 602, one or more individuals must read and hand sort the mailpieces. In fact, the mailpieces may actually be manually sorted three times: (1) at the serving processing center (to send it to the delivery postal center); (2) at the receiving delivery postal center (to sort it to the individual carrier); and (3) by the delivery carrier to sort the mailpieces in the order of their delivery route. If, at step 600, barcode 300 of each mailpiece is resolved, all mailpieces may be sorted by zip code range at step 606, for example. At step 608, a first pass of the mailpieces may be run on a DBCS, which may take one or more hours to complete. At step 610, the mailpieces can be sorted by delivery stop. At step 612, a second pass is run on the DBCS, which further sorts the mailpieces by carrier (step 614). At step 604, the mail carrier delivers the sorted mailpieces.

Figure 7:
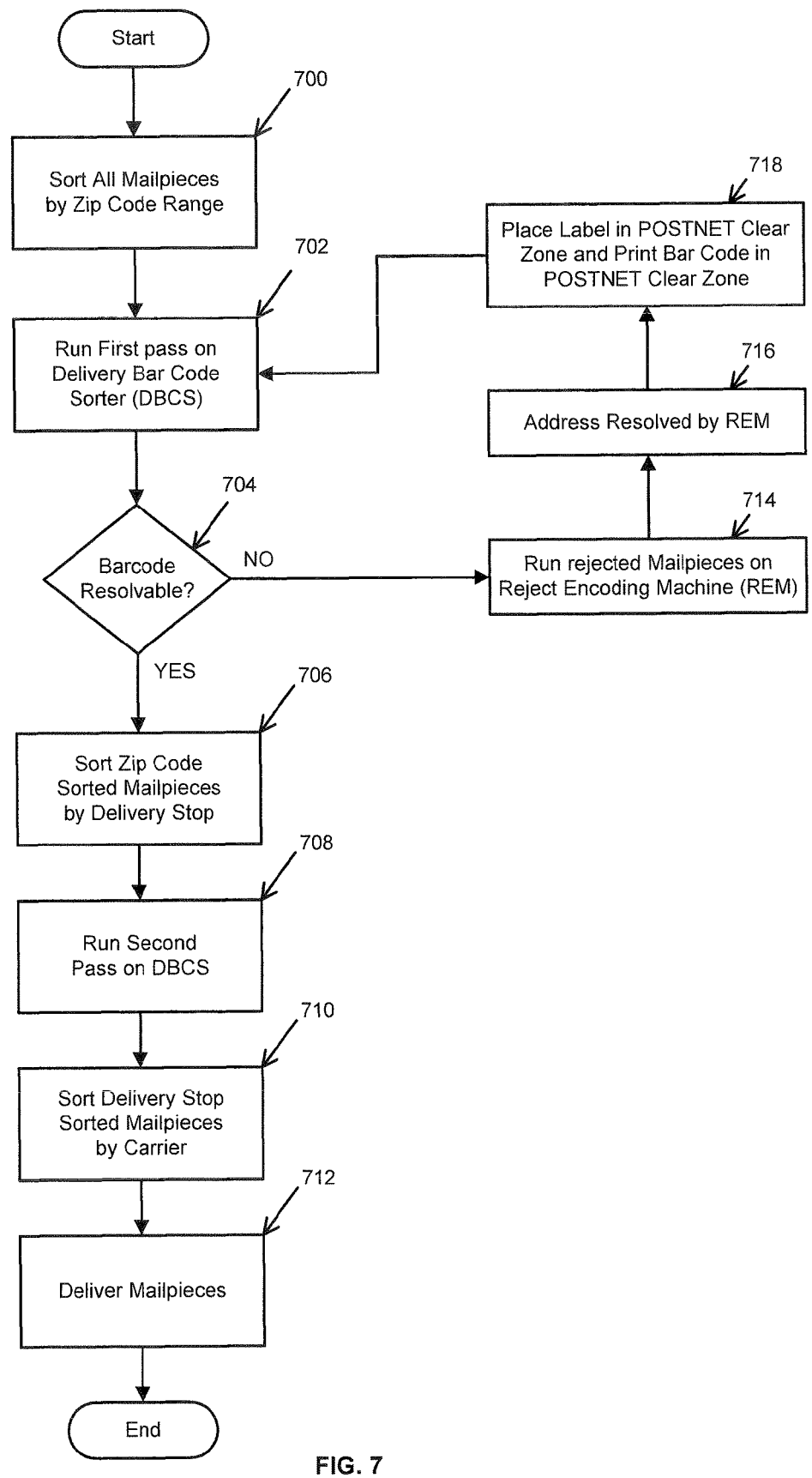
FIG. 7 is a flow chart illustrating a process for first pass delivery point sequence rejects according to one embodiment.

Another process according to one embodiment involves providing barcode 300 on mailpieces that would otherwise go through a manual sort as described with reference to FIG. 7. The DPS sorting process may occur at each serving mail processing center for the carrier offices in that service area. At step 700, all mailpieces may be sorted by zip code range, for example. At step 702, a first pass of the mailpieces may be run on a DBCS. An attempt to resolve barcode 300 is made at step 704. If barcode 300 is not resolvable, the mailpieces can be sent to and run through a labeling machine having an on-board OCR engine, such as a Reject Encoding Machine (REM) at step 714. The REM resolves address 314 at step 716. At step 718, a label can be placed in POSTNET clear zone 108 and barcode 300 may be applied in POSTNET clear zone 108. However, other methods may be used to over-label POSTNET clear zone 108. For example, barcode 300 could be applied to the label before it is applied to POSTNET clear zone 108 of mailpiece 100. In addition, instead of applying a label, POSTNET clear zone 108 could be resurfaced and barcode 300 applied to the new surface. Accordingly, mailpieces that would otherwise go through a manual sort (possibly three times) can be returned to the DBCS in time (e.g., the first pass sort may take one or more hours) to be included in a first pass sort. However, if barcode 300 of each mailpiece was resolved at step 704, the mailpieces can be sorted by delivery stop at step 706. At step 708, a second pass can be run on the DBCS, which further sorts the mailpieces by carrier (step 710). At step 712, the mail carrier can deliver the sorted mailpieces.

Read Reject Processing OSS Rejects Having Window Inserts

As previously discussed, a DPS barcode (such as barcode 300) allows mail to be sorted in the order of a mail carrier's delivery route. However, if address 314 is not resolvable by a system running in ISS mode, barcode 300 will not be applied to mailpiece 100. Mailpieces without a barcode must be manually sorted resulting in inefficiencies for the USPS and possibly delaying the delivery of the mailpieces. Sometimes address 314 is not resolvable because an image of address 314 is not readable. For example, the image of address 314 may not provide sufficient information for the OCR to resolve the address (e.g., the address may be obscured or the print may be too fine to read). In addition, address 314 may not be resolved on mailpieces having window inserts (e.g., a window normally aligned with address 314). For example, the contents (e.g., inserts) of mailpiece 100 may shift within mailpiece 100 obscuring address 314 (e.g., address 314 may fall below the window rendering address 314 unreadable).

Figure 8:
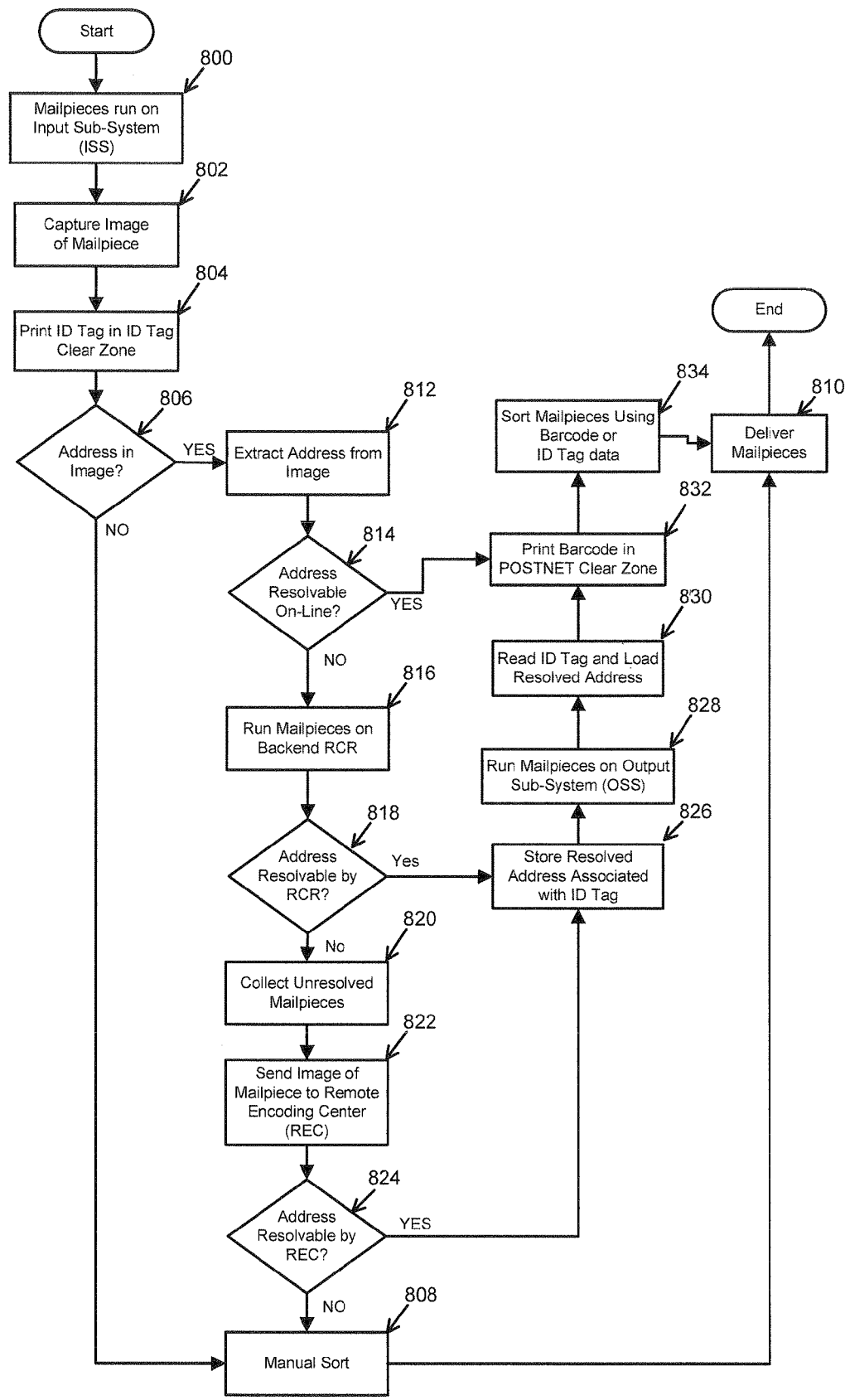
FIG. 8 is a flow chart illustrating a process for attempting to read and barcode mailpieces.

With reference to FIG. 8, a process is described that attempts to read and barcode mailpieces. At step 800, mailpieces are run on a system running in ISS mode. An image of the mailpiece (e.g., OCR read area 106) may be captured at step 802 and an ID Tag may be applied to ID Tag clear zone 202 at step 804. If the image does not contain an address, the mailpiece would be placed in a reject bin and manually sorted at step 808. The manual sort step includes reading and hand sorting the mailpieces. The mailpieces must be manually sorted again at a receiving carrier station if the mailpiece is to be delivered in the same city. If the mailpiece is being sent to a different city, the mailpieces need to be manually sorted again at a receiving processing center at a carrier station where a clerk sorts the mailpieces by carrier. The carrier then sorts the mailpieces in the order of delivery on the carrier's route and delivers the mailpieces at step 810.

If an address is in the captured image at step 806, the address is extracted from the image at step 812. At step 814, if an address is resolvable on-line (e.g., on the system running in ISS mode) barcode 300 may be applied in POSTNET clear zone 108 (step 832). The mailpieces can be sorted using barcode 300 at step 834 and delivered at step 810. However, if at step 814 the address is not resolvable, the mailpieces may be run on a backend remote computer read (RCR) at step 816. The RCR typically uses advanced OCR algorithms but may take longer (e.g., 30 seconds) to resolve the address. If address 314 is resolvable at step 818, the resolved address 314 may be stored in a database in association with the ID Tag associated with the mailpiece. When the mailpieces are run again on an Output Sub-System (OSS) at step 828, the resolved address associated with the ID Tag on the mailpiece is loaded (step 830) and barcode 300 may be applied at step 832 in POSTNET clear zone 108. The mailpieces can be run through a sorting machine (such as a DBCS) at step 834 using either barcode data or the stored ID Tag data, and then delivered at step 810.

If address 314 is not resolvable at step 818, the mailpieces with unresolved addresses are collected at step 820, such as in a reject bin. An image of OCR read area 106 may be sent to a remote encoding center (REC) at step 822 where another attempt to resolve address 314 is made. If address 314 is resolved at step 824, the resolved address associated with the ID Tag on the mailpiece is stored at step 826. The mailpiece can be run on an OSS at step 828 as previously described. However, if address 314 cannot be resolved by the REC at step 824, the mailpieces may be sent to a manual sort center for sorting by hand (step 808). At step 810, the mail carrier delivers the hand sorted mailpieces.

Figure 9:
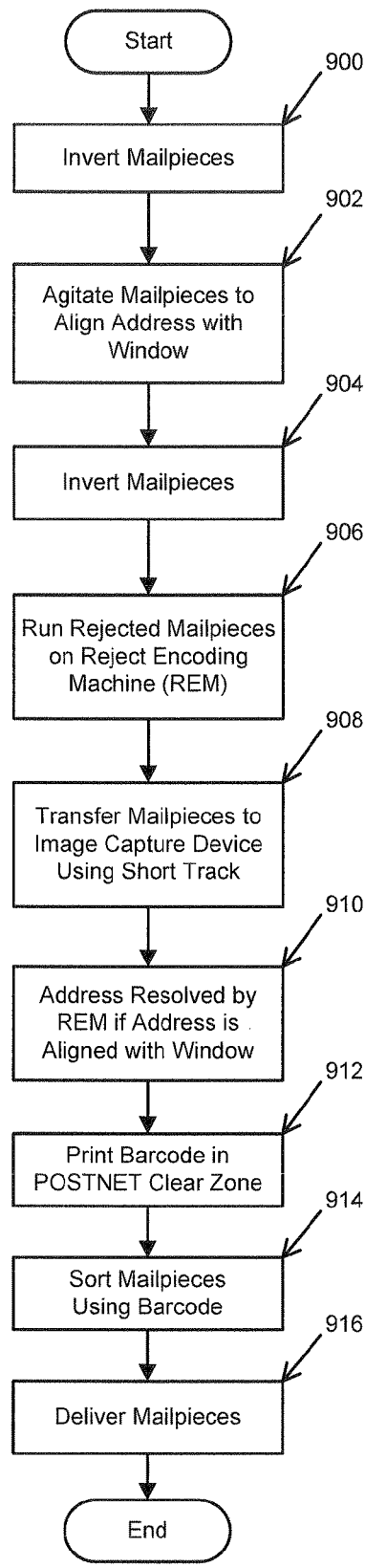
FIG. 9 is a flow chart illustrating a process for resolving an address of a mailpiece having an improperly aligned insert according to one embodiment.

With reference to FIG. 9, a process according to one embodiment attempts to read and barcode mailpieces having an unresolvable address by running the mailpieces on a machine utilizing an advanced OCR recognition system in conjunction with a short distance image capture feed section, such as a reject encoding machine (REM). The REM may utilize its own on-board OCR system in conjunction with a short distance feed section that feeds mailpieces to an image capture device, such as a camera, for imaging. An image may be provided for a "no image" OSS reject that is "no image" because the insert has fallen below a mailpiece window rendering address 314 unreadable.

At step 900, the mailpieces may be inverted by an operator. In addition, the mailpieces may be automatically inverted by a device, such as an automatic inverter. For example, a vacuum may be applied to hold the mailpiece, allowing the mailpiece to be rotated by a stepper motor or other rotating device. In addition, a gripper (e.g., one attached to an arm of a robot) may rotate the mailpiece. While this could involve rotating the mailpieces 180 degrees, the mailpieces may also be rotated by different angles, such as 90 degrees (or 270 degrees) if an insert has shifted laterally. At step 902, the mailpieces are agitated in an attempt to align address 314 with the window of the mailpiece. The agitation process may involve shaking the mailpieces on a jogger or shaking table. At step 904 the mailpieces are returned to an upright position. The mailpieces may be inverted manually (e.g., by an operator) or automatically. While this may involve rotating the mailpieces 180 degrees, as previously described, other degrees of rotation may be provided. At step 904, a gentile motion may be needed to ensure the insert does not misalign again. Steps 900, 902, and 904 typically will cause many of the inserts to return to a visible position in the window. In addition, the leading edges of the mailpieces are still lined up for imaging.

At step 906, mailpieces having an unreadable image or no image OSS rejects are run on a REM. The mailpieces can be transferred to the image capture device using a feeder having a short track at step 908. A short track is preferred as it may prevent the inserts from becoming misaligned again before the image capture device acquires an image of the address. For example, a track of eight to nine inches may be short enough to prevent the inserts from becoming misaligned, while a length of four or more feet may be too long (allowing the inserts to settle so that address is no longer visible through the window).

In other embodiments, the track may be longer if a mechanism to prevent the shifting of the insert is used. By way of example, rollers may be used to apply pressure to both sides of the mailpieces, thereby inhibiting the inserts from shifting during travel. At step 910, address 314 is resolved by the REM and barcode 300 is applied to POSTNET clear zone 108 at step 912. The mailpieces can then be sorted at step 914 and delivered at step 916.

Shiny Mail Processing

Shiny mail (e.g., mail with a high degree of gloss) can make a surface of the mailpiece non-porous and resistant to ink from both the barcode 300 sprayers and ID Tag sprayers. When barcode 300 or the ID Tag is applied to shiny mail, the barcode may smudge causing rejection by a POSTNET verifier or an ID Tag reader and thereby become rejects on an ISS, OSS, DBCS, or any other equipment that must read barcode 300, the ID Tag, or any other barcode.

Figure 10:
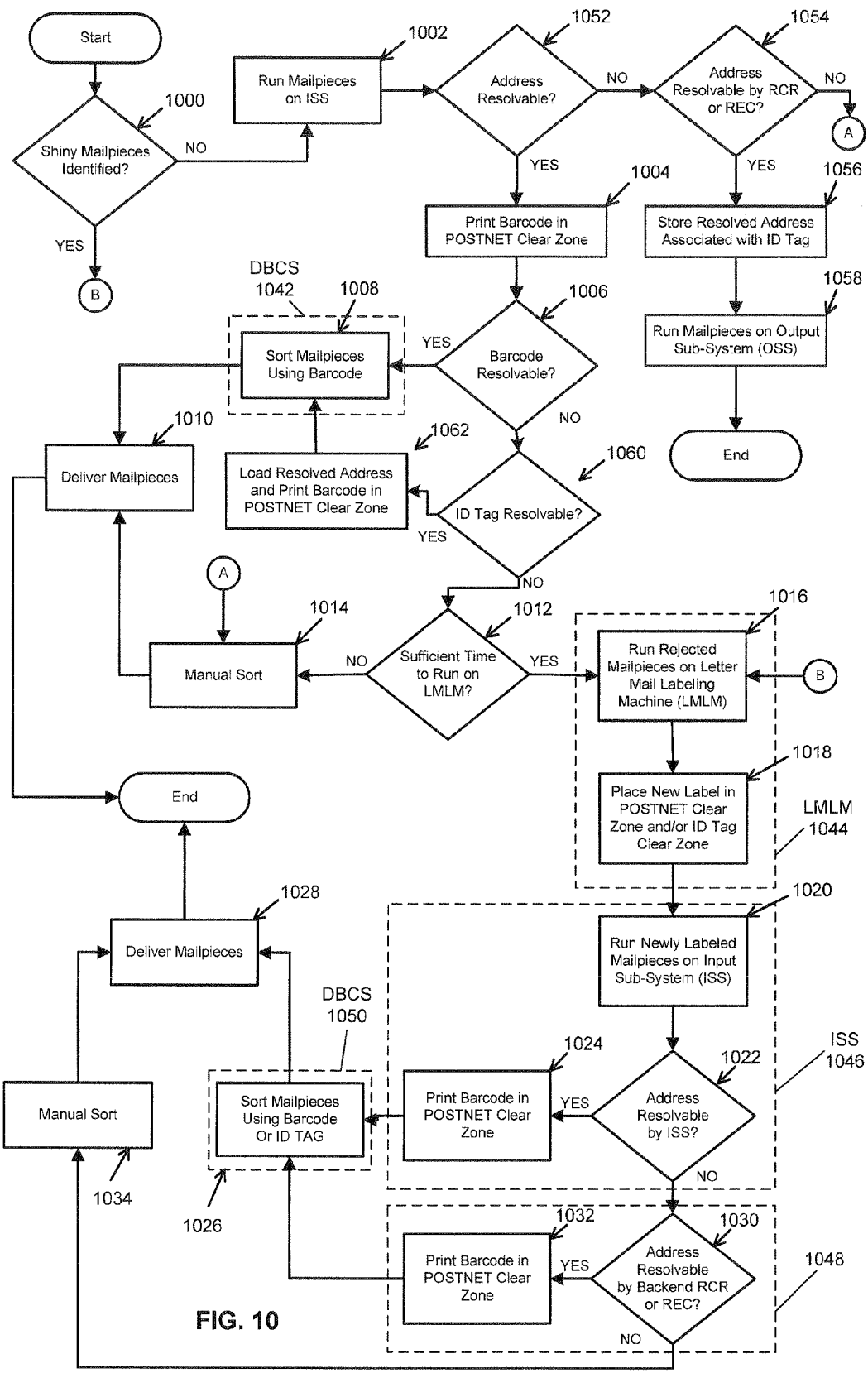
FIG. 10 is a flow chart illustrating a process for delivering mail having a high degree of gloss.

With reference to FIG. 10, a process is described that attempts to over-label shiny mailpieces. At step 1000, mailpieces may be identified as shiny. This could occur as soon as the mailpieces arrive by the mail handler (e.g., on their dock). If the shiny mail is not identified at the dock, it may be identified by a clerk preparing mailpieces for barcoding. If shiny mail is identified at step 1000, the shiny mailpieces may be transferred to Letter Mail Labeling Machine (LMLM) 1044. However, if the shiny mailpieces are not identified at step 1000, the mailpieces may be run through a system running in ISS mode at step 1002. The ISS may resolve address 314 at step 1052 and apply barcode 300 in POSTNET clear zone 108 at step 1004. If barcode 300 is resolvable at step 1006, the mailpieces may be automatically sorted by DBCS 1042 at step 1008 and delivered at step 1010.

However, at step 1006, barcode 300 may not be resolvable due to smudging of the ink (e.g., the glossy surface may not absorb the ink). At step 1012, a determination can be made if sufficient time remains to run the mailpieces on LMLM 1044. If time does not permit the mailpieces to be transported to and run on LMLM 1044 and flowed back to an ISS (e.g., ISS 1046) for recognition and barcoding, an operator may send the shiny mailpieces directly to a manual mail processing section at step 1014. For example, the unresolvable mailpieces may be identified late on Tour 3 (the afternoon shift), when cutoff times on the ISS dictate insufficient time to process on LMLM 1044. Once placed in the manual sort stream, the mailpieces typically remain there for the remainder of the trip to their destination (step 1010). This is costly and may slow down the processing of the mailpieces.

If the address was not resolved at step 1052, the address may be resolved by an RCR or REC at step 1054. If the address is not resolved at step 1054, the mailpieces would be sent for manual sorting (step 1014). However, if the address was resolved by either the RCR or REC, the resolved address associated with the ID Tag could be stored at step 1056. The mailpieces then could be run at step 1058 on an Output Sub-System (OSS).

If the ID Tag is resolvable at step 1060, the address associated with the ID Tag can be loaded and barcode 300 may be applied to POSTNET clear zone 108 at step 1062. The mailpieces may be sent to DBCS 1042 at step 1008 for sorting and delivery at step 1010. However, if the ID Tag was not resolvable at step 1060, a determination can be made if sufficient time remains to run the mailpieces on LMLM 1044 at step 1012.

The mailpieces can be transferred to LMLM 1044 if sufficient time remains to run the mailpieces at step 1016. LMLM 1044 essentially over-labels each mailpiece (e.g., places a label over POSTNET clear zone 108 or ID Tag clear zone 202). At step 1018, LMLM 1044 may over-label ID Tag clear zone 202, POSTNET clear zone 108, or both. For example, the mailpieces may be placed on a feeder backwards to allow labels to be applied to the back of the mailpieces in ID Tag clear zone 202. These mailpieces can be re-run on the front so a label can be applied over POSTNET clear zone 108. Over-labeling both sides (e.g., ID Tag clear zone 202 and POSTNET clear zone 108) can provide a fresh start when both barcode 300 and the ID Tag are not resolvable. However, the mailpieces may only be run on the front, allowing barcode 300 to be applied to POSTNET clear zone 108. Over-labeling only the front side may save time especially if mail is only going to be run on a MLOCR. After over-labeling, the mailpieces may be brought back to ISS 1046 at step 1020 and the ID Tag will be applied. At step 1022, a resolve attempt is made for address 314. If address 314 is resolved, barcode 300 is applied to POSTNET clear zone 108 at step 1024. The mailpieces may then be sorted at step 1026 on DBCS 1050 and delivered at step 1028.

If address 314 cannot be resolved on ISS 1046, another attempt may be made at resolving the address at step 1030 (which may be on a separate machine 1048) and barcode 300 may not be applied until the mailpiece is re-run on an OSS. If address 314 is resolvable at step 1030, barcode 300 may be applied at step 1032 to POSTNET clear zone 108. The mailpieces can be run through DBCS 1050 for sorting and delivery at step 1028. However, if address 314 is not resolvable at step 1030 (and possibly if there is no ID Tag), the mailpiece may be manually sorted at step 1034 and delivered at step 1028.

Figure 11:
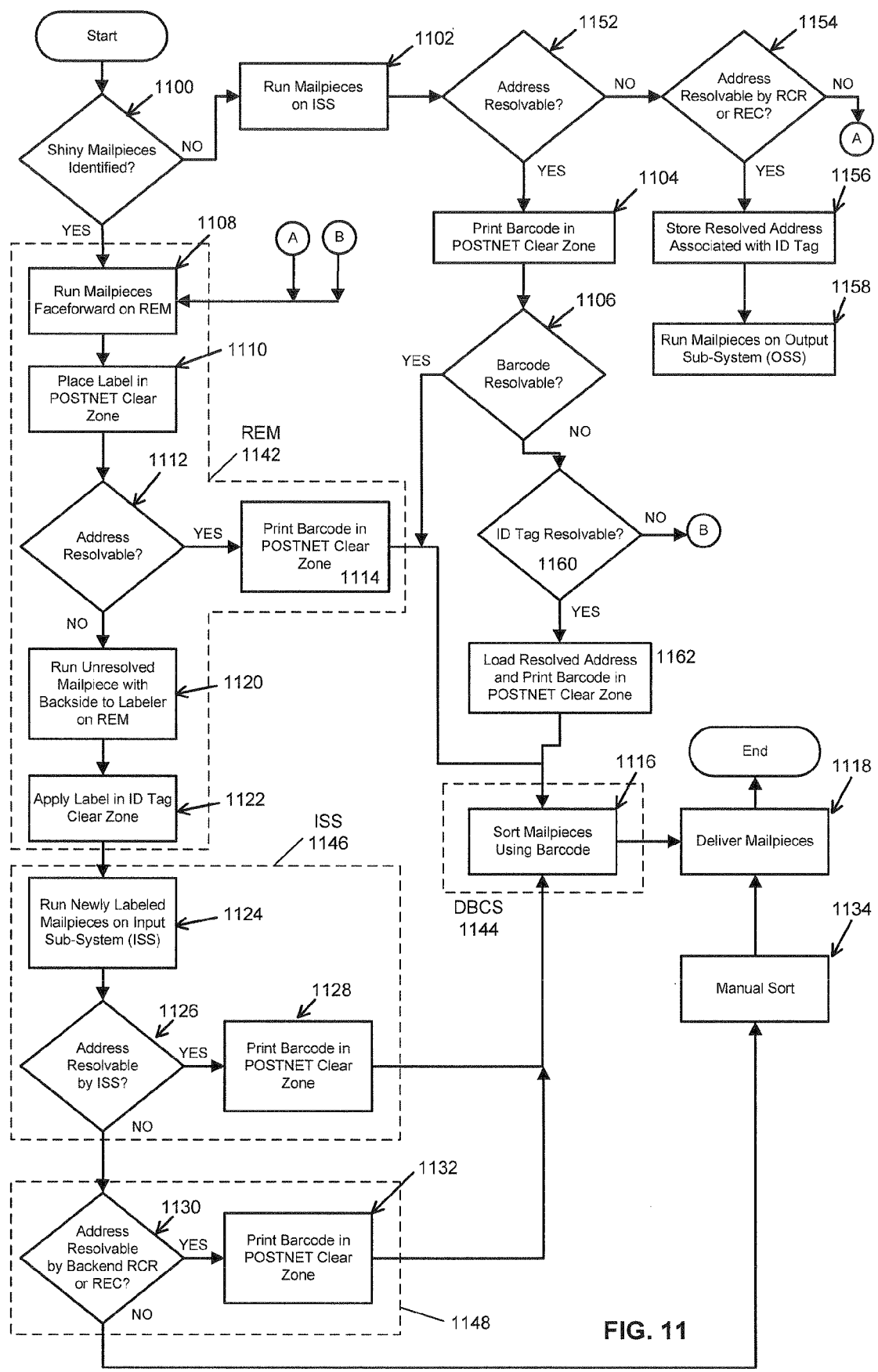
FIG. 11 is a flow chart illustrating a process for delivering mail having a high degree of gloss according to one embodiment.

With reference to FIG. 11, a process according to one embodiment is described that attempts to over-label shiny mailpieces by running the mailpieces on a machine that over-labels and applies barcode 300 in one step, such as a reject encoding machine (REM). Processing the mailpieces in one step may save time and handling and allow processing of mailpiece rejects late in a given shift that otherwise may not have processed due to time constraints. In addition, mail may be moved to a downstream DBCS sooner and allows late tour rejects to be re-introduced to the automated mail stream rather than being relegated to a manual stream.

If shiny mail is identified at step 1100 (e.g., a piece of equipment may be used to identify the shiny mail by measuring a reflectivity of a surface of the mailpiece), the shiny mailpieces may be transferred to REM 1142. However, if the shiny mailpieces are not identified at step 1100, the mailpieces may be run through an ISS at step 1102. The ISS may resolve address 314 at step 1152 and apply barcode 300 in POSTNET clear zone 108 at step 1104. If barcode 300 is resolvable (step 1106), the mailpieces may be automatically sorted by DBCS 1144 at step 1116 and delivered at step 1118. However, at step 1106, barcode 300 may not be resolvable due to smudging of the ink (e.g., the glossy surface may not absorb the ink). In that case, check whether an ID Tag is resolvable, step 1160. If so, the resolved address is loaded, 1162, barcode is printed and the process advances to sort at 1116.

If the address is not resolved at step 1152, the address may be resolved by an RCR or REC at step 1154. If the address is not resolved at step 1154, the mailpieces may be run on REM 1142 instead of sending them through a manual sort. However, if address 314 was resolved at step 1154, the resolved address associated with the ID Tag could be stored at step 1156. The mailpieces could be run at step 1158 on an Output Sub-System (OSS). If the ID Tag is resolvable at step 1160, the address associated with the ID Tag can be loaded and barcode 300 may be applied to POSTNET clear zone 108 at step 1162. The mailpieces may be sent to DBCS 1144 at step 1116 for sorting and delivery at step 1118. However, if the ID Tag was not resolvable at step 1160, the mailpieces may be run on REM 1142 at step 1108.

At step 1110, a label may be placed in POSTNET clear zone 108. If address 314 is resolved at step 1112 (e.g., if the recognition system determines a full destination barcode 300), the mailpieces may receive barcode 300 at step 1114 and may be sent to DBCS 1144 for downstream processing (e.g., sorting at step 1116 and delivery at step 1118). At step 1120, mailpieces with unresolved addresses may be re-run (this time with a back side to a labeler) at step 1120 to apply a label to the ID Tag clear zone 202 at step 1122.

At step 1124, the mailpieces can be run on ISS 1146. At step 1126, a resolve attempt is made for address 314. If address 314 is resolved, barcode 300 is applied to POSTNET clear zone 108 at step 1128. The mailpieces may then be sorted (using barcode 300) at step 1116 on DBCS 1144 and delivered at step 1118. If address 314 can not be resolved on ISS 1146, another attempt may be made at resolving the address at step 1130 (which may be on a separate machine 1148) and barcode 300 may not be applied until the mailpiece is re-run on an OSS. If address 314 is resolvable at step 1130, barcode 300 may be applied at step 1132 in POSTNET clear zone 108. The mailpieces can be run through DBCS 1116 for sorting and delivery at step 1118. However, if address 314 is not resolvable at step 1130, the mailpiece may be manually sorted at step 1134 and delivered at step 1118.

Accordingly, cost savings may be achieved when mailpieces are run on REM 1142 and receive barcode 300 in one step. In addition, mailpieces that would otherwise be sent to for manual processing (e.g., because there is insufficient time in the tour for LMLM and ISS type processing) may be processed on REM 1142 and redirected to DBCS 1144, even if the rejects were identified late in a shift. Therefore, processing on REM 1142 may save additional handling on ISS 1140. In addition, mailpieces identified late in the tour may still be processed (using automation) on REM 1142 and DBCS 1144 thereby preventing the mailpieces from flowing to manual handling and all subsequent manual handlings.

The invention claimed is:

1. A method for processing a mailpiece rejected from an automated sorting process because of an unresolved address, the method comprising the steps of:
    receiving the rejected mailpiece from the automated sorting process into a reject encoding machine;
    in the reject encoding machine, determining whether the mailpiece comprises a window envelope;
    if the mailpiece comprises a window envelope, inverting the mailpiece;
    agitating the inverted mailpiece to align an insert address with the window of the mailpiece;
    again inverting the mailpiece to return to an upright orientation;
    transferring the mailpiece using a feeder having a short track to an image capture device;
    capturing an image of a front side of the mailpiece including an address; and
    resolving the address of the mailpiece.

2. A method according to claim 1 wherein said receiving step is carried out manually.

3. A method according to claim 1 wherein said receiving step is automated by the use of a reject transfer track to input the rejected mailpiece to the reject encoding machine.

4. A method according to claim 3 including selecting a track length of the reject transfer track on the order of approximately 8 to 10 inches.

5. A method according to claim 3 including gripping the mailpiece during said transferring the mailpiece so as to inhibit the insert from shifting during travel.

6. A method according to claim 5 wherein said gripping the mailpiece includes applying an opposing set of rollers to opposite faces of the mailpiece.

7. A method according to claim 1 wherein said inverting the mailpiece includes holding the mailpiece by applying a vacuum and mechanically inverting the mailpiece while applying the vacuum.

8. A method according to claim 1 and further comprising, if the address is resolved successfully, printing a barcode label with an indicia of a postal delivery zone, and affixing the printed label to the mailpiece.

9. A method according to claim 1 and further comprising, if the address is resolved successfully, spraying a barcode of a postal delivery zone corresponding to the resolved address onto the window envelope.

10. A method according to claim 1 and further comprising, if the address is resolved successfully, applying a barcode corresponding to the resolved address in a POSTNET Clear Zone of the window envelope.

11. A method according to claim 10 and further comprising returning the labeled mailpiece for sorting in a Delivery Bar Code Sorter (DBCS) system.

12. A method according to claim 1 wherein said capture device comprises a digital camera.

13. A method according to claim 1 wherein at least one of said first and second inverting steps is conducted manually.

14. A method according to claim 1 wherein at least one of said first and second inverting steps is conducted automatically.

15. A method according to claim 1 wherein said agitating step is conducted mechanically without human intervention.

* * * * *